INVENTOR,
PAUL H. KECK.
BY
Harry M. Saragovitz
ATTORNEY

METHOD OF MAKING PHOTOSENSITIVE PLATES

Filed Feb. 18, 1952 2 Sheets-Sheet 2

INVENTOR,
PAUL H. KECK.

BY Harry M. Saragovitz

ATTORNEY.

United States Patent Office 2,739,079

Patented Mar. 20, 1956

2,739,079

METHOD OF MAKING PHOTOSENSITIVE PLATES

Paul H. Keck, Little Silver, N. J., assignor to the United States of America as represented by the Secretary of the Army Application February 18, 1952, Serial No. 272,216

1 Claim. (Cl. 117—34)

(Granted under Title 35, U. S. Code (1952), sec. 266)

This invention relates to photosensitive plates for use in electrostatic electrophotography, television pick-up tubes or the like.

It is known that vitreous or amorphous selenium may be utilized to produce a plate having a spectral response mainly in the short wave length region extending approximately to 600 millimicrons. For various reasons it is desirable to extend the spectral response into the range of longer wave lengths. For example, with a white light source, a higher total sensitivity will permit a shorter exposure of the plate or a lower level of required object brightness. Furthermore, an extended spectral response provides the possibility of a substantially panchromatic reproduction.

Vitreous selenium layers (which have a dark resistivity of the order of $10^{12}$ ohm-cm.) have been employed as a photosensitive element, but such layers cannot record the brightness values of the various colors faithfully. Red and orange colors appear as black, whereas blue is produced too brightly. It has been established that hexagonal or metallic selenium displays a strong photoconductivity, the spectral response of which is mainly in the red region. The dark resistivity of hexagonal selenium, however, is of the order of $10^5$ ohm-cm., and for the purpose of electrophotography or for pick-up tubes resistivities of the order of $10^{12}$ ohm-cm. and higher are required. Because of these characteristics, layers of hexagonal selenium are of no use in electrophotography or for pick-up tubes.

It is an object of this invention to provide a photoconductive plate having high dark resistivity and substantially panchromatic response.

A further object of the invention is to provide a new and improved photosensitive plate for use in electrophotography.

Another object of the invention is to provide a new and improved photosensitive element for a television pick-up tube.

Still another object of the invention is to provide a photoconductive plate having improved red sensitivity.

An additional object of the invention is to provide a photoconductive plate having improved yellow sensitivity.

It is also an object of this invention to provide a novel process for the production of a photosensitive plate.

An additional object of the invention is to provide a novel process for the production of a photoconductive plate of the type described.

The novel product of the present invention may be obtained by a vacuum evaporation process wherein a vapor, which is basically selenium with perhaps a small percentage of tellurium, is deposited upon a base plate under controlled conditions. The resulting photosensitive plate comprises a small amount of micro-crystalline hexagonal selenium embedded in a vitreous selenium matrix.

Figure 1:
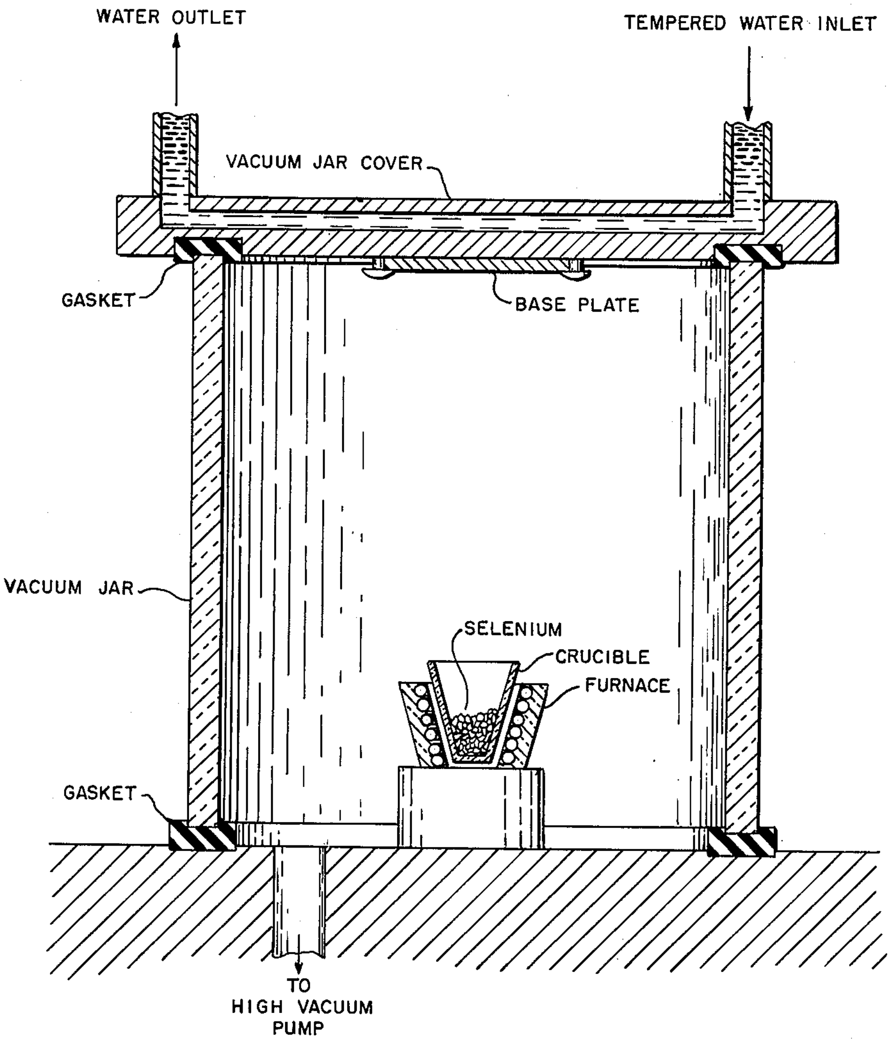
Figure 2:
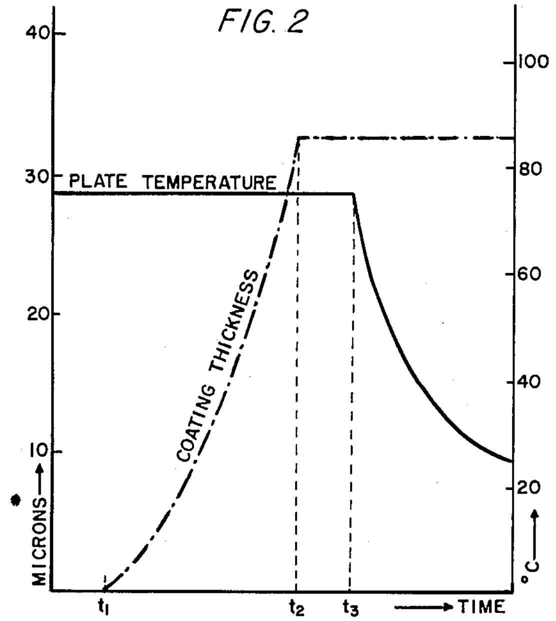
Figure 4:
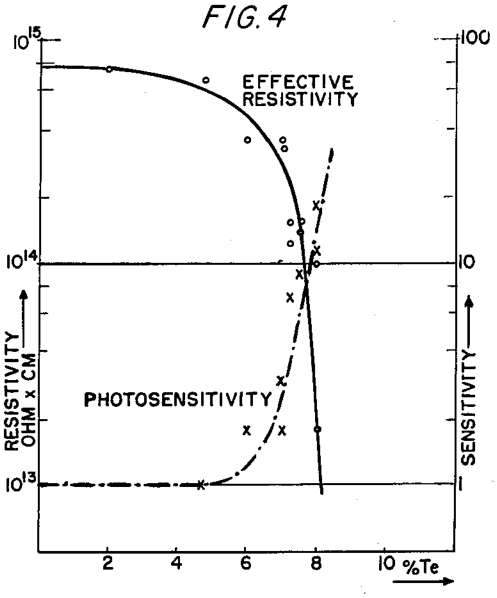
Figure 3:
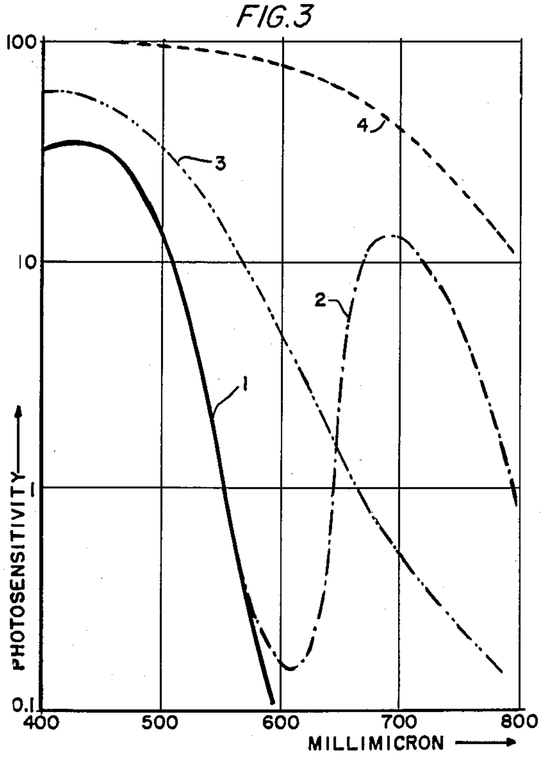

A better understanding of the invention may be had by reference to the specification along with the accompanying drawing, wherein Fig. 1 is a schematic diagram of the vacuum evaporation apparatus; Fig. 2 is a graph of thickness of deposited material and plate temperature vs. time; Fig. 3 is a graph of photosensitivity vs. wave length of incident light; and Fig. 4 is a graph of resistivity and photosensitivity vs. percentage of tellurium.

It has been found that the photosensitive qualities of vitreous selenium layers can be materially improved by the introduction of a very small amount of metallic or micro-crystalline hexagonal selenium embedded in the vitreous matrix. Favorable results have been obtained with crystals having a magnitude of the order of one micron in diameter. Such improved layers display a marked red sensitivity in addition to the spectral response of the vitreous selenium, which is predominantly blue-green. In Fig. 3 curve 1 is representative of the spectral response of vitreous selenium. Curve 2 shows the improved response due to the addition of hexagonal selenium to the vitreous matrix; the increase in red sensitivity is evident.

The spectral response of selenium plates thus composed exhibits a deep valley in the yellow range. Addition of a small amount of tellurium has been found to improve the yellow sensitivity strongly, and further, to increase the overall sensitivity. Curve 4 of Fig. 2 represents the improvement in sensitivity due to the presence of tellurium.

Although high overall sensitivity and substantially panchromatic spectral response are highly desirable properties, it is paramount that such properties not be obtained at the expense of resistivity. As stated previously, the dark resistivity of hexagonal selenium is only of the order of $10^5$ ohm-cm. It has been discovered that the desired improvement in red sensitivity can be achieved without a substantial decrease in resistivity provided the crystallites are separated by sufficient vitreous selenium. This separation can be maintained if the percentage of crystalline selenium is kept small. For a given percentage of crystalline selenium compatible with the required dark resistivity, the most favorable response conditions are obtained with a very large number of extremely small hexagonal crystals embedded in the vitreous matrix.

Again, in achieving the desired yellow sensitivity it is essential that the percentage of tellurium be kept within a certain range in order to prevent a serious decrease in effective resistivity. As indicated in Fig. 4, the resistivity decreases sharply at approximately 7% tellurium (by weight). Curve 4 in Fig. 3 is plotted for this percentage of tellurium.

To this point only the composition of the novel product has been described. The conditions requisite to the production of the photosensitive element will now be detailed.

Fig. 1 shows a vacuum jar encasing a furnace for heating a crucible and its contents. A base plate, which may be copper, brass, chromium or other suitable material having a resistivity substantially smaller than the dark resistivity of vitreous selenium, is mounted on the inner surface of the jar cover. The temperature of the base plate may be carefully controlled by the passage of water through a suitable conduit provided in the cover.

Fig. 2 shows diagrammatically how the coating process may be carried out. At time $t_1$ a fixed weight charge of selenium, which has previously been placed in the crucible and heated, begins to evaporate. At time $t_2$ the selenium charge is expended and the maximum coating thickness, which is usually 30 to 35 microns, is reached. Shortly afterwards at time $t_3$ the plate, which is kept at constant temperature during the coating process, is cooled to room temperature.

The structure of the resulting selenium coatings depends on the following variables: (*a*) temperature of the base plate, (*b*) rate of evaporation, (*c*) time during which the coating is maintained at elevated temperature, (*d*)

cooling rate of the coating to room temperature. These variables materially affect the deposition of the selenium from the vapor phase as well as the crystallization of hexagonal selenium out of the vitreous matrix. For coating temperatures up to 70° C. it has been found that the layer consists of vitreous selenium only without any traces of microcrystals, provided the coating time is shorter than 10 minutes and the plate is cooled to room temperature immediately after deposition. This indicates that under these conditions the deposition from the vapor phase occurs in the vitreous modification, which is a supercooled liquid. With slower coating rates such that the total selenium deposit has been built up in 30 minutes or longer the microcrystalline structure previously described appears. The microcrystals, therefore, must have grown after the selenium has been deposited in the vitreous modification. Additional evidence is that the inception of the microcrystalline structure always has been found in the lowest level of the selenium coating. This indicates that the crystallization in initiated in the region of the coating where the selenium deposit has been held at the elevated coating temperature for the longest time interval.

The formation of hexagonal selenium crystals from the vitreous modification is controlled by two factors: (*a*) the rate of crystal nucleation and (*b*) the rate of crystal growth. It has been determined that the rate of nucleation reaches a maximum at a base plate temperature of approximately 90° C. and decreases sharply at higher and lower temperatures. This data is not expected to be valid for the boundary region between metal and selenium, where the formulation of nuclei is affected by the metal structure and the physical condition of the interface.

At elevated temperatures and even down to room temperature a slow growth of crystals originating apparently in the nuclei can be observed microscopically. Experiment indicates that the rate of crystal growth can be expressed by the Boltzmann equation:

$$v = Be^{-U/KT}$$

where $v$ is the rate of growth, $e$ is the base of the natural logarithm, U is the activation energy of crystallization, K is the Boltzmann constant, B is a constant, and T is the temperature. From measurements of the rate of crystal growth the activation energy for the formation of hexagonal crystals from the vitreous modification is calculated to be 1.05 electron volts.

Knowing the data of nucleation and rate of crystal growth, the structure of the selenium layers obtained by the coating process can be analyzed. With a coating time ($t_2 - t_1$ in Fig. 2) of approximately 1 hour, and coating temperatures below 50° C., the number of nuclei and the rate of crystal growth is so small that the coatings contain no measurable amount of crystalline selenium. With rising coating temperatures the number of crystals increases appreciably. The size of the crystals and the size distribution throughout the coating is controlled by the length of heat treatment and the rate of evaporation. At approximately 90° C. the coating contains a maximum number of individual crystals.

Since the hexagonal crystals have conductivity which is at least 6 to 8 powers greater than that of vitreous selenium, a high insulation can only be maintained as long as the crystallites are separated by enough vitreous selenium. Coating temperature and time are therefore limited to such values as to keep the amount of crystalline selenium at a very small percentage of the vitreous modification. Along the metal selenium interface the concentration of the hexagonal selenium is highest because of the large rate of nucleation which takes place there during the period of selenium deposition.

The dark conductivity depends upon the direction of the electric field. For coating temperatures below 50° C. the effective resistivity is much higher if the free surface is charged negatively with respect to the metal base. For coating temperatures above 60° C., on the other hand, the effective resistivity of the selenium coatings has been found to be higher for a positive surface charge.

At low coating temperatures the spectral response is substantially as in curve 1 of Fig. 3. With increasing coating temperatures the response approximates curve 2. From theoretical considerations it appears that the seat of the additional red photoconductivity is at a small boundary region between the crystals and the surrounding vitreous selenium. Consequently, the total effective region which produces the red sensitivity is larger, the smaller the crystal size for a given concentration of hexagonal modification. Commensurate with a desired dark resistivity, the most favorable conditions would therefore be expected with a very large number of extremely small hexagonal crystals embedded in the vitreous matrix. Experiments have confirmed these conclusions, for excellent results have been obtained with coating temperatures in the vicinity of 90° C., where the nucleation is a maximum, as pointed out above. A range of 70–95° C. has been found optimum. Rapid coating in this temperature region results in a large number of small crystals; however, if the rate of evaporation is too slow, or the interval during which the coating is held at elevated temperatures is too long, too much crystalline selenium forms, and the dark resistivity deteriorates. Optimum results have been obtained for 60 to 90 minutes treatment at 70°, to 1 to 2 minutes treatment at 95° (where treatment period includes the time from beginning of evaporation to the time when the plate is brought to room temperature).

Another method of obtaining the desired red sensitivity is to subject a plate comprising vitreous selenium to a moderate heat treatment for a given period of time. It has been found that a 40–80° C. temperature range is suitable, but here again prolonged heat treatment results in a large decrease in the insulating properties of the coating. The rate of crystal growth increases greatly with temperature; thus, the period of elevated coating temperature must be shorter with high temperatures.

As indicated previously, the addition of a small amount of tellurium materially improves the yellow sensitivity and also increases the overall sensitivity. In the evaporation process, this addition may be accomplished by melting the tellurium and selenium together before placing the raw material in the crucible for evaporation. Fig. 4, as indicated, shows the effect upon photosensitivity and effective resistivity for various concentrations of tellurium by weight. The sensitivity curve is plotted for a white light source approximately 2300° K. color temperature. The useful gain in sensitivity depends on the minimum tolerable effective dark resistivity for a particular application. In electrophotography, for example, a gain by a factor of 10 to 20 can be achieved, assuming a 20 second half time for the dark decay. For television pickup tubes a much higher gain is feasible. Concentrations of 5–9% selenium have been utilized to produce a photoconductive coating which is superior in both overall sensitivity and panchromatic response. Curve 4 indicates the type of response obtainable at high coating temperatures due to the addition of tellurium. At low coating temperatures, the tellurium merely causes the blue-green sensitivity of vitreous selenium to shift toward longer wave lengths, without a substantial increase in red sensitivity.

The invention described herein may be manufactured and used by or for the Government for governmental purposes, without the payment to me of any royalty thereon.

What I claim is:

The method of making a panchromatic photosensitive plate having high overall sensitivity with extended spectral response in the red region comprising the steps of heating a conductive plate in an evacuated vessel to a temperature of near 95° C.; forming and depositing vapor of selenium upon the heated base while maintained at said temperature in a vacuum so that the selenium forms a vitreous matrix containing micro-crystalline hexagonal selenium crystals in the order of a micron in diameter, and cooling the base to room temperature, the total time from the beginning of deposition to the attainment of room temperature being within the limits of 1–2 minutes at near 95° C. whereby a large boundary region is produced between said crystals and the surrounding vitreous selenium without adversely affecting the dark resistivity of the plate.

References Cited in the file of this patent

UNITED STATES PATENTS

| | | |
|---|---|---|
| 1,491,040 | Hart | Apr. 22, 1924 |
| 1,997,479 | Burg | Apr. 9, 1935 |
| 2,462,157 | Blackburn | Feb. 22, 1949 |
| 2,476,042 | Hewlett | July 12, 1949 |
| 2,608,611 | Shive | Aug. 26, 1952 |

FOREIGN PATENTS

| | | |
|---|---|---|
| 19,780 | Australia | Apr. 30, 1929 |
| 611,540 | Great Britain | Nov. 1, 1948 |
| 456,138 | Italy | Mar. 24, 1950 |

OTHER REFERENCES

"The Physical Properties of Selenium," P. J. Nicholson, The Physical Review, second series, January 1914, vol. III, No. I, pages 1–23, pages 1–5 particularly relied upon.